Earl & Holcroft,

Oiling Wool,

No. 3,632. Reissued Sept. 7. 1869.

Witnesses;
Wm. Alpert Dine
John Parker

Inventors;
B. A. Earl
H. Holcroft
By their Atty
H. Howson

N. PETERS, PHOTO-LITHOGRAPHER, WASHINGTON, D. C.

United States Patent Office.

B. A. EARL, OF PHILADELPHIA, PENNSYLVANIA, ASSIGNEE OF B. A. EARL AND HENRY HOLCROFT.

*Letters Patent No.* 47,938, *dated May* 30, 1865; *reissue No.* 3,632, *dated September* 7, 1869.

IMPROVEMENT IN APPARATUS FOR OILING WOOL.

The Schedule referred to in these Letters Patent and making part of the same.

*To all whom it may concern:*

Be it known that B. A. EARL, of Philadelphia, Pennsylvania, and HENRY HOLCROFT, of Media, Delaware county, Pennsylvania, did invent certain Apparatus for Oiling Wool, for which Letters Patent were granted to them on the 30th day of May, 1865, and that I, B. A. EARL, the sole owner of the same patent, do hereby declare the following to be a full, clear, and exact description of the said invention, which consists of a box, containing lubricating-material, in combination with a sprinkler, to which such a movement is imparted that it will be immersed in the said lubricating-material, and discharge the same by percussion, and in small drops, on to the traversing wool, thereby insuring the effective and uniform saturation of the same.

In order to enable others skilled in the art to make and use the invention, I will now proceed to describe its construction and operation, reference being had to the accompanying drawing, which forms a part of this specification, and in which—

Figure 1:
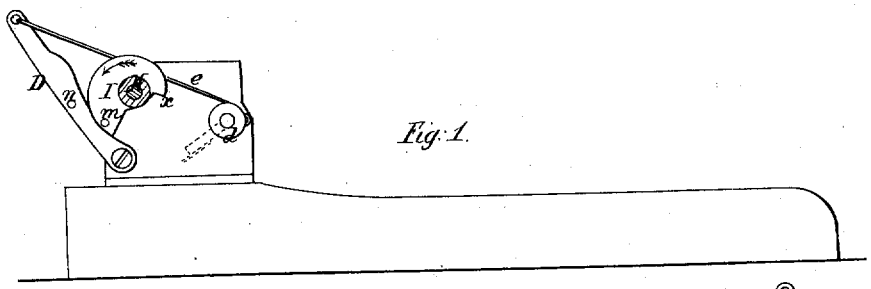
Figure 2:
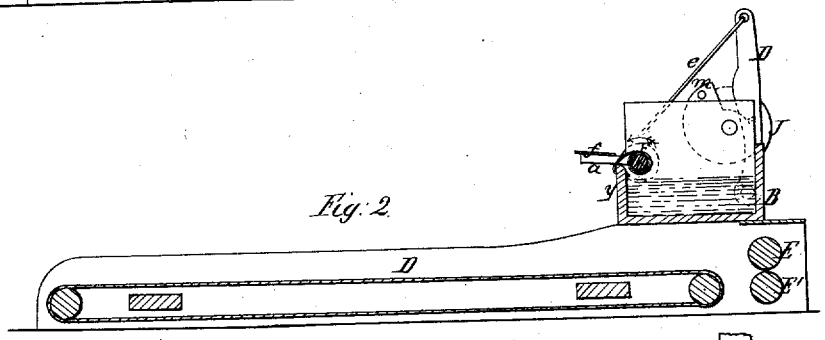

Figure 1 is a side view of the apparatus for oiling wool in carding-engines, pickers, &c.;

Figure 2, a transverse section; and

Figure 3:
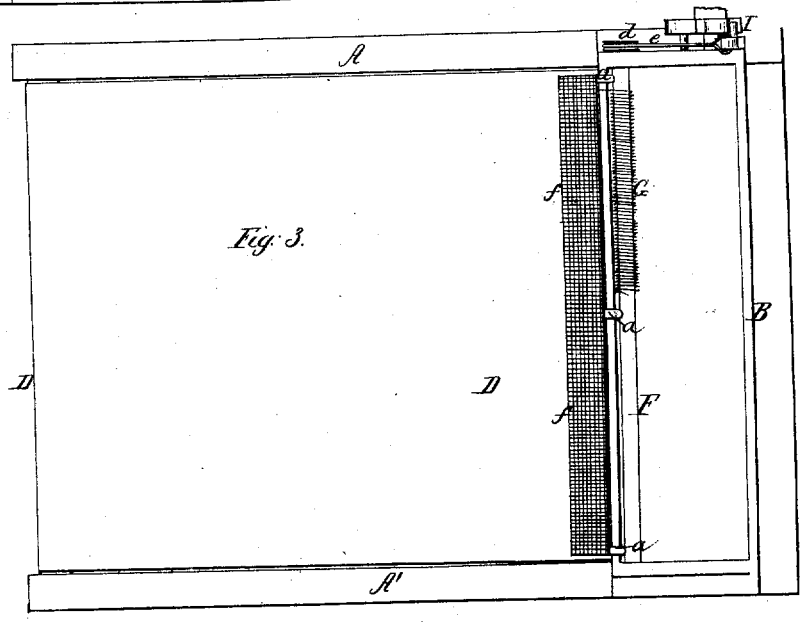

Figure 3, a plan view.

Similar letters refer to similar parts throughout the several views.

A and A′ represent portions of the side frames of a carding-engine, to which is secured the box or reservoir B, containing the lubricating-material.

D is the usual endless band of slats, on which the wool is placed, and by which it is conveyed to the feed-rollers E and E′, fig. 2.

A shaft, F, is arranged to turn in the opposite ends of the box, and from this shaft project arms *a a*, carrying a strip of wire gauze, or other equivalent arrangement of wires or rods, forming the sprinkler.

A spiral spring, G, coiled around the shaft, tends to turn the same in the direction of the arrow, fig. 2, and to force the arms *a* against the front edge *y* of the box B.

On one end of the shaft, outside the box, is a pulley, *d*, to the periphery of which is secured one end of a chain or cord, *e*, the other end being connected to the lever D′, which is hung to the end of the box, and from the latter projects a pin, H, carrying a cam, I, and a pulley, J, to which a rotary motion, in the direction of the arrow, fig. 1, is imparted by a band, or by any suitable system of gearing, from any moving part of the carding-engine or picker.

As the cam I continues to revolve, its pin *m* will move away from the lever D′; but a pin, *n*, on the latter, will bear against the edge of the cam, so that the sprinkler will remain immersed in the lubricating-material until the shoulder *x*, on the cam, passes the pin *n*, when the lever will be released, and the spring G will turn the shaft F rapidly in the direction of the arrow, fig. 2, and cause the arms *a* of the sprinkler to strike the front edge, *y*, of the box with such force that the lubricating-material, carried up by and contained in the meshes of the gauze, will be spirted or sprinkled in a number of small drops on to the wool beneath.

This operation of causing the sprinkler to be immersed in and pass through the lubricating-material, and then to discharge the same by percussive action, is repeated, and must of necessity result in the effectual and uniform saturation of the traversing wool.

A series of wires, arranged in the form of a comb, may be used in place of the gauze.

Although specific mechanism has been described and illustrated for operating the sprinkler, it will be evident to those familiar with machinery of this class, that other devices may be employed to actuate the said sprinkler, with the view of producing its desired action.

I therefore claim, as the invention of the said EARL and HOLCROFT, and desire to secure by Letters Patent—

The mechanism for oiling wool, substantially as described, said mechanism consisting of an oil-reservoir and a sprinkler, having such a movement imparted to it that it will enter the oil in the reservoir, and then discharge the adhering oil on to the wool in the form of drops or spray.

In testimony whereof, I have signed my name to this specification, before two subscribing witnesses.

B. A. EARL.

Witnesses:

H. HOWSON,

JOHN WHITE.